June 28, 1960 L. LEDUC 2,942,468
FUEL TANK CONTENTS LEVEL INDICATOR
Filed Oct. 14, 1957

INVENTOR
LUCIEN LEDUC

United States Patent Office 2,942,468
Patented June 28, 1960

2,942,468

FUEL TANK CONTENTS LEVEL INDICATOR

Lucien Leduc, P.O. Box 269, Assiniboia,
Saskatchewan, Canada

Filed Oct. 14, 1957, Ser. No. 689,979

1 Claim. (Cl. 73—321)

My invention relates to new and useful improvements in fuel level indicators, particularly indicators adapted for use with fuel oil or gasoline storage tanks either situated above ground or below ground.

The majority of fuel tank indicators consist of a float operating a vertically movable stem within a sight glass which is adapted to be fitted to the top of a fuel tank. This type has several disadvantages, one being that it obviously has to be extremely small so that one has to be extremely close in order to see the position of the indicator within the glass. This indicator is often obscured also, by snow and ice and the inside of the glass often becomes obscured or stained. Other tanks, particularly tanks situated below the ground, have to be dipped in order to ascertain the fuel level therein. Fuel oil tanks, particularly home installations, are provided with indicators which are not visible unless one climbs to the top of the tank platform and this is obviously inconvenient and often leads to the tank becoming empty at an inconvenient time.

My invention overcomes these disadvantages by providing a positive indicator means situated either upon the end of the tank or, if the tank is underground, immediately above, with a clear indication of the exact level of fuel therein at all times and being of such a nature that it can be read from a distance, as for example, through the window of the home.

The principal object of my invention is, therefore, to provide a fuel level indicator which is positive reading and which at all times indicates the exact level of fuel therein, there being no linkage or electrical apparatus to break down and cause inaccurate reading.

A further object of my invention is to provide a device of the character herewithin described which is particularly suitable for use with conventional fuel oil tanks having a vent pipe therein, inasmuch as my device is adapted to be situated within this vent pipe and to extend downwardly within the tank.

Yet another object of my invention is to provide a device of the character herewithin described which can readily be assembled to existing tank installations.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figures 1, 2, 3, 4:
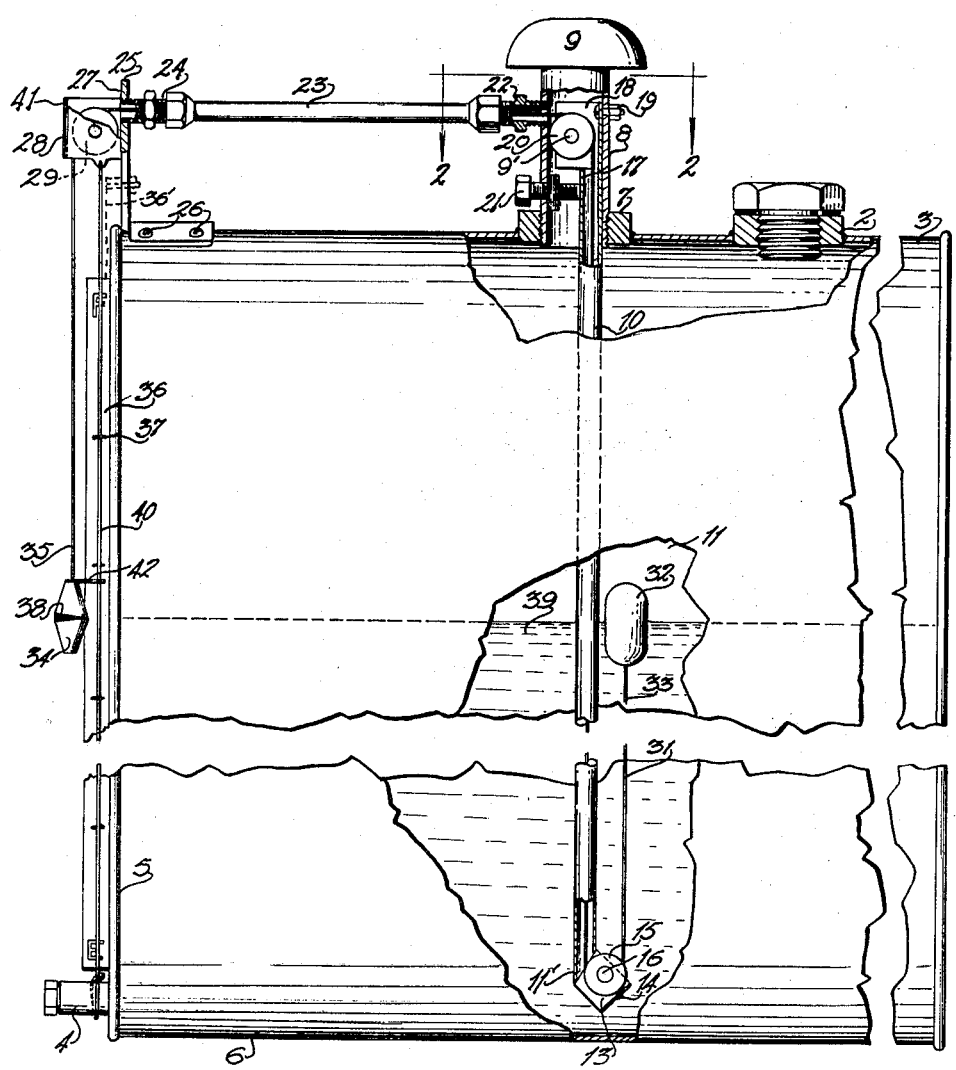
Figure 1 is a side elevation of a fuel tank with my device in situ, sectioned in part to show the interior thereof.
Figure 2 is a section of the vent pipe along the line 2—2, but without the tank being shown.
Figure 3 is an enlarged fragmentary perspective view of the lower end of my conduit within the tank.
Figure 4 is a schematic view on reduced scale showing my installation in a tank installed below ground.

Proceeding, therefore, to describe my invention in detail, Figure 1 represents a conventional cylindrical tank for storing fuel oil or gasoline, it being understood that this tank normally is supported upon an elevated frame (not illustrated). A filler plug 2 is incorporated upon the upper side 3 of the tank and a drain plug 4 is situated in one end 5 adjacent the base 6 thereof.

A nut 7 is normally welded within the upper surface 3 of the tank, said nut receiving the lower screw-threaded end of a vertically situated vent pipe 8 capped by a conventional vent cap 9.

A conduit 10 extends vertically downwardly into the interior 11 of the tank, said conduit terminating within the aforementioned vent tube 8 and being clamped into position by means of a clamp bolt 21 passing through the wall of the vent pipe. The lower end 11' terminates adjacent the base 6 of the tank and is provided with an offset casing 12 welded thereto or otherwise secured in a conventional manner. This casing includes a pair of spaced and parallel side plates 13 and an end plate 14 and acts as a housing for a sheave 15 journalled for rotation upon pin 16 spanning the side plates 13.

With the vent tube 8 and above the upper end 17 of the conduit 10 is a sheave housing 18 secured within the vent tube by means of nut and bolt 19. This sheave housing carries a sheave 20 journalled for rotation upon pin 9' and just above this sheave is a nipple 22 extending through the wall of the vent tube.

A further conduit 23 is secured to the nipple 22 and extends towards the end 5 of the tank where it is connected to a further nipple assembly 24 supported within a bracket 25 secured in turn to the upper surface of the tank by means of screws 26 as clearly shown in Figure 1.

Upon the outer face 27 of this bracket I have affixed a further sheave housing 28 carrying a sheave 29 journalled for rotation upon a pin 30.

A flexible cord 31 extends around the sheave 15 within the tank, upwardly through the conduit 10, over the sheave 20 within the vent tube 8, through the conduit 23 and around the sheave 29 upon the bracket 25. A float 32 is secured to the end 33 of the flexible cord within the tank 1 and an indicator weight 34 is secured to the end 35 of the cord outside of the tank.

A fixed scale 36 is secured to the end 5 of the tank either outstanding from the tank as shown in Figure 1, or alternatively, secured flat against the end 5 and indicated in phantom by the reference character 36'. The position of this indicator scale is dependent upon the position from which the tank is viewed normally and is a matter of installation choice. Indicia markings 37 are placed upon the scale and the indicator weight is provided with a mark or arrow 38 thereon. The mark or arrow 38 corresponds exactly with the position of the float 32 which in turn depends upon the level of the fuel 39 within the tank. It will be appreciated that as the float falls with the level of the fuel, the weight also falls and conversely, when the weight rises as fuel is added to the tank, then the weight itself rises so that the weight and float are always at the same level thus permitting the indicator weight to indicate the exact level of fuel within the tank at all times.

In order to prevent the weight from being affected by wind or the like, I have provided a guide wire 40 extending between the sheave housing 41 of the sheave 29 and the drain pipe or plug 4. I also provide a small bracket 42 which extends from the indicator weight and is apertured so that the bracket can freely encircle the guide wire 40.

The aforementioned embodiment is primarily for tanks situated above ground, but the device is readily adaptable for indicating fluid levels of tanks situated below ground, Reference should be made to Figure 4 which shows this schematically.

Reference character 43 indicates the tank situated below the ground level 44 and 45 indicates the conduit extending downwardly into the tank by means of a gland fitting 46. This conduit extends upwardly above the ground level for a distance at least equal to the diameter of the tank and the conduit is provided with offset casings 47 and 48 upon each end thereof which in turn contain sheaves (not illustrated) similar to sheave 15 hereinbefore described.

A flexible cord 49 extends around these sheaves having a float 50 secured to the end of the cord within the tank and an indicator weight 51 secured to the end of the cord externally of the tank. The scale means 52 is secured to the portion 53 of the pipe above ground and indicia markings are placed upon this scale so that the weight indicates the exact level of the fuel within the tank below ground.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

The combination of a fuel tank having a vertical vent pipe at the top thereof, and a fuel level indicator comprising a vertical tube having its upper end portion disposed in said vent pipe and extending downwardly in said tank to a point adjacent the bottom of the latter, means for securing the upper end portion of said tube in said vent pipe, upper and lower guide pulleys rotatably mounted at the respective upper and lower ends of said tube, said vent pipe being provided adjacent the upper guide pulley with a lateral opening, an elongated flexible element extending through said pipe and engaging said upper and lower guide pulleys, said element having an inner end portion extending upwardly within said tank from the lower guide pulley toward the level of liquid in the tank, a float connected to the inner end of said element, a vertically elongated scale disposed exteriorly of the tank, a third guide pulley provided at the upper end of said scale, said flexible element having an outer end portion extending outwardly through said opening in said vent pipe and downwardly over said third guide pulley, an indicator weight connected to the outer end of said element in horizontal alignment with said float, said indicator weight being movable upwardly and downwardly relative to said scale in coordination with rising and falling of fuel level in said tank, a vertical guide wire provided exteriorly of the tank adjacent said scale, and guide means provided on said indicator weight and slidably engaging said guide wire, said pipe and said upper and lower guide pulleys and said float being of a smaller transverse dimension than the inside diameter of said vent pipe whereby the same may be installed in and removed from the interior of the tank through the vent pipe.

References Cited in the file of this patent

UNITED STATES PATENTS

| | | |
|---|---|---|
| 1,144,528 | Cole | June 29, 1915 |
| 1,225,178 | Rogers | May 8, 1917 |
| 1,617,315 | Lanson | Feb. 8, 1927 |
| 1,969,186 | Russ | Aug. 7, 1934 |
| 1,982,970 | Star | Dec. 4, 1934 |
| 2,522,988 | Caddell | Sept. 19, 1950 |